(No Model.)
A. G. MEEZE.
PROCESS OF MANUFACTURING GAS FROM OIL AND STEAM.
No. 382,372. Patented May 8, 1888.
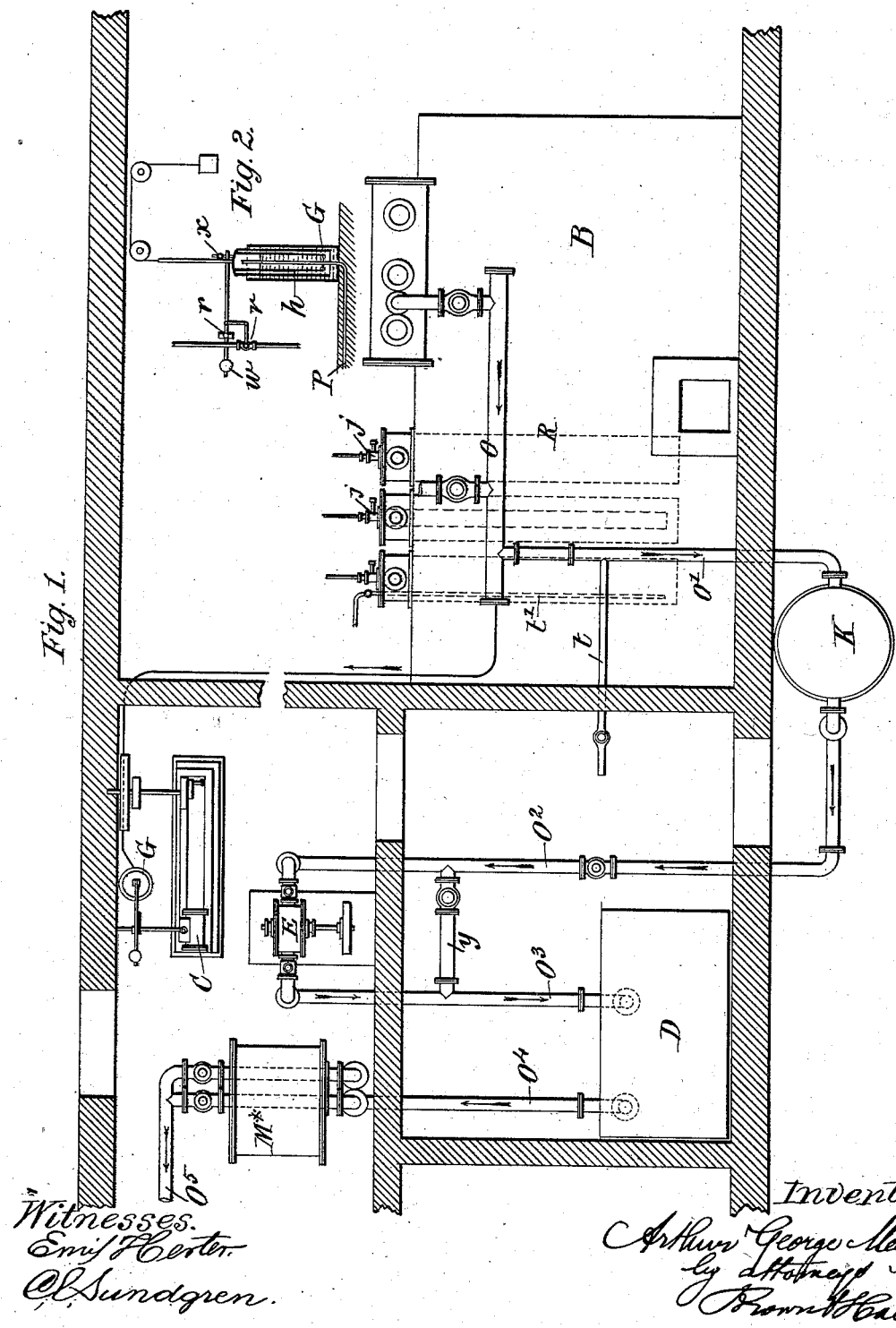

UNITED STATES PATENT OFFICE.

ARTHUR G. MEEZE, OF REDHILL, COUNTY OF SURREY, ENGLAND.

PROCESS OF MANUFACTURING GAS FROM OIL AND STEAM.

SPECIFICATION forming part of Letters Patent No. 382,372, dated May 8, 1888.

Application filed August 25, 1887. Serial No. 247,808. (No model.)

*To all whom it may concern:*

Be it known that I, ARTHUR GEORGE MEEZE, of Redhill, in the county of Surrey, England, have invented certain new and useful Improvements in the Method of Manufacturing Gas from Fluid Hydrocarbons, of which the following is a specification.

This invention relates to improvements by means of which many difficulties hitherto experienced in the manufacture of gas from steam and fluid hydrocarbons may be overcome.

Heretofore in manufacturing illuminating-gas by the injection of steam, together with petroleum, shale-oil, or hydrocarbons of a kindred nature, into suitable retorts, the process has proved inefficient in consequence of the difficulties experienced, first, in obtaining from reasonably-hot retorts a really fixed gas; second, in regulating and controlling the light-giving quality of the product; third, in keeping the retorts, particularly such as are fitted with deflecting or impact devices, free from obstructive deposit; fourth, in maintaining a regular action of the injector, and consequently a continuous production of gas.

I have discovered that I can remove these difficulties, expedite the process, and dissociate mixed hydrocarbon and water vapors into a fixed and merchantable gas much more efficiently and at a lower and less destructive temperature than heretofore by conducting the operation under a partial vacuum. Moreover, by reducing and maintaining the pressure of gas in the retorts considerably below that of the atmosphere, I am enabled readily to admit an induced current of hydrogen, water-gas, or air either before or after the gas is made, for the purpose of dilution, or for chemically influencing the oil-gas in process of manufacture.

In carrying out my invention I make use of a suitable exhauster and motor in combination with an oil-gas apparatus, which consists, primarily, of a steam and oil injecting or aspirating device and a decomposing-retort, the thermolyzing efficiency of which may be increased by a complement of deflecting or impact devices. For the better and automatic regulation of the process I place the above-mentioned apparatus under control of a suitable governor. It is by the combined action of the governor and the exhauster and motor that I maintain the partial vacuum in the retorts constant and regulate the induced current of air, hydrogen, or water gas.

I am aware that in the ordinary process of making gas exhausters are pretty generally employed, and inasmuch as in carrying my improvements into effect I also make use of an exhauster or its equivalent, but for a different purpose, I will here point out wherein the difference lies. Hitherto the purpose for which exhausters have been used has been to remove or "get away" with the gas already made, and thus to relieve the retorts of undue pressure, and to keep the gas from prolonged contact with its heated sides, which are apt to induce unprofitable decomposition. Consequently the object has been to keep a level (or nearly level) gage on the retorts; but the object heretofore has never been to obtain a vacuum or partial vacuum within the retort during the process of dissociating mixed vapors of steam and fluid hydrocarbons for the purpose of facilitating the production of fixed illuminating-gas and of controlling and regulating its merchantable character by the proportionate induction of diluents or chemically-active agents, as in my present invention. In fact, the use of an exhauster as herein contemplated would be mischievous in the ordinary process of making gas.

In the accompanying drawings, Figure 1 is a general plan view of part of a gas-works arranged according to my system; and Fig. 2 is a separate view in sectional elevation, on a larger scale, of a governor used in connection with the exhauster, and to be presently described.

B is the plan of the retort-setting, consisting of two benches of retorts of three each. One hydraulic main is removed to leave the retort mouth-pieces below it exposed.

$j$ is the steam and oil injector opening into an ingression-pipe, (shown in dotted lines at I,) by means of which the vapors are conveyed to the rear end of the retort R.

O is the principal main connected by the main O' with the condenser K. From K the main $O^2$ leads to the exhauster E, from whence the main $O^3$ leads to the drying-box D. The mains $O^2$ and $O^3$ are connected by a by-pass, Y, provided with a check-valve, allowing gas to shunt when the exhauster is not operating.

The main $O^4$ leads to the meter $M^*$, and the main $O^5$ to the holder.

$t$ is an inlet or induction pipe supplied with a regulating-tap for admitting air, hydrogen, or water-gas into the main O, but which inlet-pipe may open directly into the retort or ingression-pipe, or at any other convenient point.

At $t'$, I have shown in dotted lines how the inlet-pipe opens into the retort when I admit hydrogen or water gas for chemically influencing the oil-gas before it is properly fixed.

The exhauster E is driven by a small steam-engine, C, through overhead shafting. (Not shown in the drawings.)

G is the tank of a small governor, (shown separately at Fig. 2,) consisting of a gas-pressure holder, $h$, balanced by a counterpoise, $w$, and communicating by means of a pipe, P, with the hydraulic main and retorts, so that it varies in position with the vacuum in them, and in thus varying actuates the rod $r$ and the steam or throttle valve $v$, so as to regulate and control the speed of the engine and maintain a constant pressure or vacuum in the retorts under varying conditions in the feed of steam and oil from the injector.

$x$ is a tap for regulating the flow of displaced air from the annular space $g$ of the holder $h$, and by means of which the sensibility of the governor may be adjusted and its too hasty response controlled should any extreme variation of pressure occur. By this means the reduced pressure of gas within the retort is maintained uniform, and is adjustable to suit differences in the quality of the hydrocarbons used and in the proportions of the induced supply of air, hydrogen, or water-gas. These proportions are only determinable by experiment, and depend upon the candle-power of the gas desired and the quality of the hydrocarbons employed.

Incidentally my improvements overcome many difficulties peculiar to the process of making gas from steam and fluid hydrocarbons, such as back-pressure, which, by a serious retarding action on the rate of dissociation, has hitherto prevented the economical working of oil-gas plant. Moreover, by thus reducing the pressure I can fix the gas at a lower and less destructive temperature than heretofore and effect a great saving in wear and tear of plant, and utilize iron retorts where only fire-clay retorts were previously eligible. I also prevent the formation of obstructive deposit and assist and regulate the action of the injector.

The admission of an induced current of air, hydrogen, or water-gas for diluting or chemically influencing the gas during manufacture is for the former purpose preferably effected by the pipe $t$, and for the latter by the pipe $t'$, so that the hydrogen or water-gas may undergo thermolysis in the retort in contact with the vapors of oil and steam, and thereby enter into new chemical combinations.

From the above description it will be seen that my invention does not consist merely in the addition of an exhauster to ordinary gas-plant, for this has been done before for the purposes explained; nor yet in the addition of the exhauster to the special apparatus for producing oil-gas herein referred to, though in this there are features of novelty; but inasmuch as I have discovered the beneficial and economical results to be obtained by manufacturing gas for illuminating purposes from steam and hydrocarbon fluids when dissociated under a vacuum or greatly-reduced pressure in retorts, I claim—

1. The process of manufacturing fixed illuminating-gas which consists in admitting steam and hydrocarbon fluid into a suitable retort, and therein subjecting them to gaseous thermolysis under a constantly-maintained and uniformly-controlled partial vacuum or reduced pressure, whereby a uniform quality of gas is produced, as described.

2. The process of manufacturing fixed illuminating-gas which consists in subjecting hydrocarbon fluid to gaseous thermolysis in a suitable retort under the influence of a uniform constantly maintained and controlled partial vacuum or reduced pressure, and at the same time admitting an induced current of air, hydrogen, or water-gas for the purpose of dilution or of chemically influencing the gas in process of manufacture, whereby a uniform quality of gas of any desired candle-power is produced, as described.

ARTHUR G. MEEZE.

Witnesses:
 H. K. WHITE,
 G. H. G. MATHIESON,
*Both of 6 Bream's Buildings, London, E. C.*